(12) United States Patent
Greenwood et al.

(10) Patent No.: US 7,163,358 B2
(45) Date of Patent: Jan. 16, 2007

(54) INJECTION GROUTING

(75) Inventors: Peter Greenwood, Göteborg (SE); Inger Jansson, Hisings Kärra (SE); Ulf Skarp, Hisings Backa (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/644,488

(22) Filed: Aug. 20, 2003

(65) Prior Publication Data

US 2005/0079016 A1    Apr. 14, 2005

Related U.S. Application Data

(60) Provisional application No. 60/405,207, filed on Aug. 22, 2002.

(51) Int. Cl.
*E02D 3/12* (2006.01)
*C09K 17/00* (2006.01)

(52) U.S. Cl. ............ 405/266; 405/263; 405/267; 516/111; 516/82; 516/79

(58) Field of Classification Search ........... 405/263, 405/266, 267, 270; 516/78, 79, 82, 111
See application file for complete search history.

(56) References Cited

U.S. PATENT DOCUMENTS

| | | | |
|---|---|---|---|
| 2,630,410 A | 3/1953 | Clapsadle et al. | 252/313 |
| 4,102,400 A | 7/1978 | Crinkelmeyer et al. | 166/283 |
| 4,687,373 A | 8/1987 | Falk et al. | 405/128 |
| 4,732,213 A * | 3/1988 | Bennett et al. | 166/292 |
| 5,194,087 A | 3/1993 | Berg | 106/18.12 |
| 5,368,833 A | 11/1994 | Johansson et al. | 423/338 |
| 5,370,478 A * | 12/1994 | Bartlett et al. | 405/129.6 |
| 5,396,749 A | 3/1995 | Fukushima | 57/744 |
| 5,565,026 A * | 10/1996 | Hense et al. | 106/600 |
| 5,569,323 A | 10/1996 | Frouin et al. | 106/633 |
| 5,836,390 A | 11/1998 | Apps et al. | 166/281 |
| 6,008,275 A | 12/1999 | Moreau et al. | 524/5 |
| 2003/0127024 A1* | 7/2003 | Heiberger et al. | 106/634 |

FOREIGN PATENT DOCUMENTS

| | | |
|---|---|---|
| DE | 41 04 596 A1 | 8/1992 |
| DE | 199 25 412 A1 | 12/2000 |
| DE | 100 01 831 A1 | 8/2001 |
| EP | 0 495 336 A1 | 7/1992 |
| JP | 2001-3047 | 1/2001 |

OTHER PUBLICATIONS

Grace Davison, Ludox® Colloidal Silica, downloaded from www.gracedavison.com/products/ludox/overview.htm, verified by http://web.archive.org/web/20010107010300/http://www.gracedavison.com/products/ludox/overview.htm, 3 page3, Jan. 7, 2001.*
Grace Davison, Ludox® Technical Information, downloaded from http://www.gracedavison.com/products/ludox/techinfo.htm, verified by http://web.archive.org/web/20010111091500/www.gracedavison.com/products/ludox/techinfo.htm, 4 pages, Jan. 11, 2001.*
European Search Report No. EP 02 44 5103 dated Jan. 15, 2003.
Abstract of EP 4 495 336 from EPO on-line data base esp@cenet.
Abstract of DE 41 04 596 from EPO on-line data base esp@cenet.
Abstract of DE 199 25 412 from EPO on-line data base esp@cenet.
Abstract of DE 100 01 831 from EPO on-line data base esp@cenet.
Patent Abstracts of Japan abstracting JP 2001-3047.
Iler, Ralph K., "The Chemistry of Silica," John Wiley & Sons, 1979, title page and pp. 407-409.
Iler et al., "Degree of Hydration of Particles of Colloidal Silica in Aqueous Solution ," J. Phys. Chem. 60, 1956, pp. 955-957.
English language translation of Japanese Laid-Open No. 2001-3047; laid-open dated Jan. 9, 2001.
Moore, Paul, "Silica flour: The finest money can buy," Industrial Minerals, Jun. 2002, pp. 46-49.
Iler, Ralph K., "The Chemistry of Silica," John Wiley & Sons, 1979, pp. 312-313.

* cited by examiner

*Primary Examiner*—Katherine Mitchell
(74) *Attorney, Agent, or Firm*—Michelle J. Burke; David H. Vickrey; Robert C. Morriss

(57) ABSTRACT

The invention relates to the use of a composition for injection grouting obtainable by mixing an alkali metal silicate or an organic silicate, colloidal silica particles, and at least one gelling agent, wherein the weight ratio of colloidal silica to silicate is from about 2:1 to about 100:1. The invention also relates to a method of sealing a leaking part or cavity, and method of cutting off a liquid flow in a leaking part or cavity. The invention further relates to a composition for injection grouting and a method for preparing such composition.

16 Claims, No Drawings

INJECTION GROUTING

This application claims priority of U.S. Provisional Patent Application No. 60/405,207, filed Aug. 22, 2002.

The present invention relates to the use of a composition for injection grouting, a method of sealing by injecting a grouting composition, a method of cutting off a liquid flow, a grouting composition and a method of providing such composition. The grouting composition comprises colloidal silica particles, an alkali metal silicate or an organic silicate, and at least one gelling agent.

BACKGROUND OF THE INVENTION

The requirements and performance of compositions used for sealing rock and soil have increased over time. The requirements involve both improved environmental and technical aspects. Previously, various plastics and polymers involving toxic substances have been employed to seal water leaks in e.g. concrete walls, tunnels, dumps etc. Such sealing chemicals have in a number of cases caused contamination of groundwater and health problems. However, attempts have been made to replace hazardous products with more environmentally adapted ones. New products have also been sought for to meet the recently imposed leakage restrictions. Water leakage levels as low as 1 liter/(min*100 meters) have occasionally been the upper threshold on constructions sites of tunnels. U.S. Pat. No. 5,396,749 describes a method for cutting off a water flow by grouting whereby water leakage and collapse of ground is prevented. The cut-off agent is prepared by mixing e.g. colloidal silica, inorganic salt, and a water-soluble urethane polymer. However, the strength of these agents has shown to be insufficient in several applications, particularly where the agent during injection and gelling is exposed to a high water pressure. Especially unstable agents have during the ageing phase resulted in a fairly low long term strength.

Sealing agents have also been used for sealing soil to prevent leakage of contaminants in subterranean areas like buried sources, dumps etc. U.S. Pat. No. 5,836,390 discloses a method of forming subsurface barriers where a viscous liquid comprising polybutenes, polysiloxanes, and colloidal silica is injected. However, such barriers are not always sufficiently strong to prevent aqueous and organic liquids from penetrating. Further to this, stability problems or pre-gelling of the sealing composition have many times rendered the sealing procedure inefficient.

It would be desirable to provide a stable and environmentally adapted liquid cut-off agent having a high early strength as well as long term strength, especially in the field of sealing rock, where the cut-off agents may be subjected to high water pressure from groundwater. It would also be also desirable to provide durable products which resist washout forces and have a low permeability or even impermeable to water and other liquids.

It is therefore an object of the present invention to provide products solving the drawbacks of the prior art.

THE INVENTION

The present invention relates to the use of a composition for injection grouting obtainable by mixing an alkali metal silicate or an organic silicate, colloidal silica particles, and at least one gelling agent, wherein the weight ratio of colloidal silica to silicate is from about 2:1 to about 100:1.

The invention also relates to a method of sealing a leaking part or cavity comprising injecting into the leaking part or cavity a composition obtainable by mixing an alkali metal silicate or organic silicate, colloidal silica particles, and at least one gelling agent, wherein the weight ratio of colloidal silica to silicate is from about 2:1 to about 100:1.

The invention also relates to a method of cutting off a liquid flow in a leaking part or cavity by injecting into the leaking part or cavity a composition obtainable by mixing an alkali metal silicate or an organic silicate, colloidal silica particles, and at least one gelling agent, wherein the weight ratio of colloidal silica to silicate is from about 2:1 to about 100:1.

The invention also relates to a method of preparing a composition for injection grouting and a grouting composition obtainable from said method. The invention also relates to a composition for injection grouting comprising colloidal silica particles, an alkali metal silicate or an organic silicate, and at least one gelling agent, wherein the weight ratio of colloidal silica to alkali metal silicate is from about 2:1 to about 100:1.

Generally, in all inventions defined, the weight ratio of colloidal silica to silicate preferably is from about 3:1 to about 70:1, more preferably from about 6:1 to about 50:1, even more preferably from about 6:1 to about 20:1, and most preferably from about 6:1 to about 10:1. However, according to one embodiment, the weight ratio of colloidal silica to silicate is from about 8:1 to about 100:1, preferably from about 8:1 to about 20:1.

According to one embodiment, the composition is dispersed in an aqueous solution, most preferably an aqueous silica sol. According to one embodiment, except for the possible presence of organic silicate and/or organic gelling agent as defined herein, no further organic compounds are present in the composition.

The term "injection grouting" as used in this context particularly means sealing by injecting a grouting composition, particularly sealing of cavities or leaking parts such as sealing fissures, cracks, particularly in rock and soil as well as in constructions such as roads, tunnels, bridges, buildings, e.g. floors and walls of parking garages; concrete pipes; well cementing, as well as other subterranean constructions such as marine constructions e.g. quays, piers, and jetties. "Injection grouting" as used herein also comprises injection in cementitious grouting. The most preferred application is injection in rock and/or soil.

Colloidal silica particles and silica sols can be derived from e.g. precipitated silica, micro silica (silica fume), pyrogenic (fumed silica), silanes, siloxanes, or silica gels with sufficient purity.

The terms "colloidal silica particles" and "silica sol" used herein also comprise e.g. aluminium-modified and boron-modified silica particles and sols. Boron-modified silica sols are further described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified silica sol is further described e.g. in "The Chemistry of Silica", by Iler, K. Ralph, pages 407–409, John Wiley & Sons (1979) and in U.S. Pat. No. 5,368,833.

The colloidal silica particles suitably have an average particle diameter ranging from about 3 to about 150 nm, preferably from about 7 to about 50 nm, and most preferably from about 10 to about 40 nm. Suitably, the colloidal silica particles have a specific surface area from about 20 to about 1000, preferably from about 40 to about 400, and most preferably from about 60 to about 300 $m^2/g$.

The colloidal silica particles suitably have a narrow particle size distribution, i.e. with a low relative standard deviation of the particle size. The relative standard deviation of the particle size distribution is the ratio between the mean particle size by numbers and the standard deviation of the particle size distribution. The relative standard deviation of the particle size distribution preferably is lower than about 60% by numbers, more preferably lower than about 30% by numbers, and most preferably lower than about 15% by numbers.

The colloidal silica particles suitably are dispersed in water in presence of stabilising cations such as $K^+$, $Na^+$, $Li^+$, $NH_4^+$, organic cations, quaternary, tertiary, secondary, and primary amines, or mixtures thereof so as to form an aqueous silica sol. However, also other dispersions such as organic solvents, e.g. lower alcohols, acetone or mixtures thereof may be used to prepare organic silica sols. However, use of aqueous silica sols is preferred in the compositions according to the invention, and the colloidal silica particles added to the composition is dispersed in a solvent in a concentration from about 1 to about 70, preferably from about 5 to about 60, and most preferably from about 10 to about 50wt % counted as dry weight silica. The pH of the dispersion suitably is from about 1 to about 12, preferably from about 7 to about 11. A high silica content is preferred in the composition as long as the colloidal silica particles remain stable without immediate substantial aggregation and/or gelation before injecting the composition after addition of gel agent. This is beneficial considering the superior technical performance such composition has but also the reduced transportation cost thereof.

The colloidal silica suitably has an S-value from about 20 to about 100, preferably from about 30 to about 90, and most preferably from about 60 to about 90.

It has been found that compositions for injection grouting with an S-value within the ranges defined herein can impart improved long-term gel strength.

The S-value characterises the extent of aggregation of colloidal silica particles, i.e. the degree of aggregate or microgel formation. The S-value has been measured and calculated according to the formulas given in Iler, R. K. & Dalton, R. L. in J. Phys. Chem. 60(1956), 955–957.

The S-value is dependent on the silica content, the viscosity, and the density of the colloidal silica. A high S-value indicates a low microgel content. The S-value represents the amount of $SiO_2$ in percent by weight present in the disperse phase of e.g. a silica sol. The degree of microgel can be controlled during the production process as further described in e.g. U.S. Pat. No. 5,368,833.

The alkali metal silicate used may contain any of the alkali metals potassium, sodium, and lithium, preferably potassium. The organic silicate may contain any suitable organic substance, e.g. amines. The molar ratio of $SiO_2/M_2O$, wherein M is sodium or potassium preferably is from about 1 to about 4. The molar ratio of $SiO_2/M_2O$, wherein M is lithium or an organic component, preferably is from about 1 to about 20.

The term "gel strength" as used herein is a measure of the unconfined compressive strength of the gelled composition that develops with time. It has also been found that the composition has low permeability which is crucial in sealing applications.

The gelling agent, which is capable of gelling colloidal silica, suitably is an inorganic salt or acid, e.g. an alkali metal salt, an organic salt or acid such as sodium acetate, acetic acid, preferably an inorganic salt. Examples thereof include aluminium chloride, aluminium nitrate, aluminium sulphate, potassium chloride, calcium chloride or other calcium donor such as cement, sodium chloride, magnesium chloride, magnesium sulphate, potassium iodide, sodium hydrogen phosphate, magnesium nitrate, sodium nitrate, potassium nitrate, calcium nitrate, and sodium silicate or mixtures thereof, preferably calcium chloride, sodium chloride or potassium chloride, and most preferably sodium chloride and/or sodium aluminate, or mixtures thereof.

Preferably, the content of gelling agent in the composition, preferably as an aqueous composition, suitably is in an amount from about 1 to about 30 wt %, preferably from about 2 to about 15 wt % of the total dry weight of silicate and silica particles.

In order to prepare the composition for injection grouting, colloidal silica particles and alkali metal silicate or organic silicate are preferably added as a premix to the gelling agent. According to one preferred embodiment, the premix and the gelling agent are added separately to the point to be sealed. This may be performed e.g. by means of so called jet grouting, wherein the ingredients are mixed in situ, e.g. in the soil.

The injection grouting composition is suitably used in smaller cracks, preferably with a diameter ranging from about 2 μm to about 20 mm, preferably from about 2 μm to about 5 mm, and most preferably from about 20 μm to about 1 mm.

The composition for injection grouting may further comprise a hydraulic binder or other mineral binders such as lime, gypsum etc, and/or concrete. The hydraulic binder may be e.g. a cement such as Ordinary Portland Cement (OPC), micro cement (highly ground cements) or blended cements as further described in e.g. U.S. Pat. No. 6,008,275. Concrete comprises aggregates such as stone, gravel and sand, crushed concrete, lime, stone filler, slag cement, fly ash, silica flower, glass filler and other preferred inorganic material, suitably with an average particle diameter range from about 0.01 to about 100 mm, preferably from about 0.125 to about 100 mm. Aggregates are suitably comprised in an amount of from about 100 to about 1000wt % based on the weight of the hydraulic binder. The composition comprising the hydraulic binder can be used for sealing e.g. larger cracks, preferably with a diameter ranging from about 0.02 mm to about 20 mm, preferably from about 0.05 to about 10 mm, and most preferably from about 0.1 to about 10.

A gel time regulator such as an acidic triacetine (glycerine triacetate), diacetine, Glauber's salt ($NaSO_4*10H_2O$), hydrochloric acid, sulphuric acid, phosphoric acid or mixtures thereof may also be added to the composition to control the gelation thereof.

The term "gel time", as used herein, means the amount of time elapsed from the moment of mixing the ingredients making up the sealing composition to the time when the sealing composition becomes too viscous to move or be injected. The viscosity is suitably controlled in such a way that a homogeneous moving front of the composition is formed moving towards the point to be sealed. Suitably, the initial viscosity of the sealing composition is from about 3 to about 100, preferably from about 4 to about 30 mPas. The gel time may easily be controlled by adjustment of the amount of gelling agent. Sometimes, instantaneous gelling without substantial dilution of the composition is necessitated to provide a gelled pressure-resistant composition. A short gel time may be optimal in cracks that are relatively shallow and where the risk for rapid dilution of the composition exists. In some cases, it is essential that the gelling does not start before the front of the inserted composition has fully penetrated the crack. The gel time for sealing rock suitably ranges from about 1 to about 120, preferably from about 2 to about 60, more preferably from about 5 to about 40, and most preferably from about 20 to about 40 minutes. The suitable gel time for soil sealing ranges from about 5 minutes to about 24 hours, preferably from about 10 minutes to about 6 hours, and most preferably from about 15 minutes to about 3 hours.

The components making up the composition may be mixed at ambient temperature. The gelling agent is suitably added to the premix of colloidal silica particles and silicate in an aqueous solution in an amount from about 1 to about 30 wt %, preferably from about 2 to about 15 wt % of the dry weight of the premix of silicate and silica particles.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following example will further illustrate how the described invention may be performed without limiting the scope of it.

All parts and percentages refer to part and percent by weight, if not otherwise stated.

EXAMPLE 1

Samples comprising a potassium silicate solution available from Askania AB, with a $SiO_2$ content of 23.4 per cent by weight and a $K_2O$-content of 10.9 per cent by weight and silica sols of table 1 were premixed prior to adding 20 g of a 10 wt % sodium chloride solution. All samples were cured at 20° C. The UCS (Unconfined Compressive Strength) was tested in accordance with ASTM C403. All silica sol proportions are given by weight of the solutions as supplied. It can clearly be seen that an increased gel strength is achieved by the above-defined formulation compared to the control solutions (references) A and N.

TABLE 1

| Silica sol | Particle Diameter | S-value (%) | Specific surface area ($m^2/g$) | Silica content (%) | Surface Modification |
|---|---|---|---|---|---|
| Cembinder ® 20 | 12 nm | 68 | 220 | 30 | aluminate |
| Cembinder ® 22 | 12 nm | 76 | 220 | 40 | none |
| Cembinder ® 36 | 7 nm | 71 | 360 | 30 | none |

TABLE 2

| Composition/gel time (20 g 10 wt % NaCl solution was added to all samples A–S) | Gel strength after 24 hours (kPa) | Strength after 7 Days (kPa) |
|---|---|---|
| A) Control 100 g Cembinder ® 20, gel time: 10 minutes | No measurable strength | No measurable strength |
| B) 97.5 g Cembinder ® 20, 2.5 g K silicate solution, gel time: 10 minutes | 280 | 140 |
| C) 95 g Cembinder ® 20, 5 g K silicate solution Gel time: 10 minutes | 690 | 410 |
| D) 92.5 g Cembinder ® 20, 7.5 g K silicate solution Forms a hard crust after addition of salt | 480 | 690 |
| E) 90 g Cembinder ® 20, 10 K Silicate solution Difficult to mix (gels quickly) | 480 | 690 |
| F) 85 g Cembinder ® 20, 15 g K Silicate solution Forms a hard brittle crust with a soft gel underneath | 690 | 970 |
| G) Control 100 g Cembinder ® 20 Gel time 10 minutes | 480 | 759 |
| H) 97.5 g Cembinder ® 22, 2.5 g K Silicate solution Gel time: 3 minutes. | 970 | 1241 |
| I) 95 g Cembinder ® 22, 5 g K Silicate solution, very rapid gelling | 1241 | 1655 |
| J) 92.5 g Cembinder ® 22, 7.5 g K Silicate solution | 1517 | 2069 |
| K) 90.0 g Cembinder ® 22, 10 g K Silicate solution. Gel time: 10 minutes | 2210 | 2621 |
| L) 85 g Cembinder ® 22, 15.0 g K Silicate solution Forms a hard brittle gel with some bleed liquid on top after 24 hours | 1379 | 3034 |
| M) 50 g Cembinder ® 22, 50 g K Silicate solution Does not gel | No measurable strength | No measurable strength |
| N) Control 100 g Cembinder ® 36, 20 g Salt solution Gel time 10 minutes. | 410 | |
| O) 97.5 g Cembinder ® 36, 2.5 g K Silicate solution | 690 | |
| P) 95 g Cembinder ® 36, 5 g K Silicate solution | 828 | |
| Q) 90 g Cembinder ® 36, 10 g K Silicate solution Gel time: 10 minutes | 2138 | |
| R) 85 g Cembinder ® 36, 15 g K Silicate solution | 1241 | |
| S) 50 g Cembinder ® 36, 50 g K Silicate solution. Does not gel | No measurable strength | |

The invention claimed is:

1. A method of sealing a leaking part or cavity comprising injecting into said leaking part or cavity a grouting composition comprising an alkali metal silicate or an organic silicate, colloidal silica particles dispersed in a solvent in a concentration from about 10 to about 70 wt % counted as dry weight silica, and at least one gelling agent, wherein the composition has a weight ratio of silica to silicate from about 2:1 to about 100:1.

2. A method according to claim 1, wherein the colloidal silica particles are present in a silica sol having an S-value from about 30 to about 90.

3. A method according to claim 1, wherein the composition further comprises a hydraulic binder.

4. A method according to claim 1, wherein the weight ratio of silica to silicate is from about 3:1 to about 70:1.

5. A method according to claim 1, wherein the weight ratio of silica to silicate is from about 6:1 to about 20:1.

6. A method according to claim 1, wherein the silica particles have a relative standard deviation of the particle size distribution lower than about 15% by numbers.

7. A method according to claim 1, wherein the gelling agent is an alkali metal salt.

8. A method according to claim 1, wherein the gelling agent is added resulting in an amount of from about 1 to about 30 wt % of the total dry weight of silicate and silica particles.

9. A method of sealing a leaking part or cavity comprising injecting into said leaking part or cavity a grouting composition comprising an alkali metal silicate or an organic silicate, colloidal silica particles dispersed in a solvent in a concentration from about 10 to about 70 wt % counted as dry weight silica, and at least one gelling agent in an amount effective to result in a gelling time from about 1 minute to about 24 hours, wherein the composition has a weight ratio of silica to silicate from about 2:1 to about 100:1.

10. A method according to claim 9, wherein the colloidal silica particles are present in a silica sol having an S-value from about 30 to about 90.

11. A method according to claim 9, wherein the composition further comprises a hydraulic binder.

12. A method according to claim 9, wherein the weight ratio of silica to silicate is from about 3:1 to about 70:1.

13. A method according to claim 9, wherein the weight ratio of silica to silicate is from about 6:1 to about 20:1.

14. A method according to claim 1, wherein the silica particles have a relative standard of deviation of the particle size distribution lower than about 15% by numbers.

15. A method according to claim 9, wherein the gelling agent is an alkali metal salt.

16. A method according to claim 9, wherein the gelling agent is added resulting in an amount of from about 1 to about 30% of the total dry weight of the silicate and silica particles.

* * * * *